US012546079B2

(12) United States Patent
Wei et al.

(10) Patent No.: US 12,546,079 B2
(45) Date of Patent: Feb. 10, 2026

(54) HEAT COLLECTION BAG, DEVICE AND METHOD FOR SOLIDIFYING AND FILLING CALCIUM SAND FOUNDATION

(71) Applicant: INSTITUTE OF ROCK AND SOIL MECHANICS, CHINESE ACADEMY OF SCIENCES, Wuhan (CN)

(72) Inventors: Houzhen Wei, Wuhan (CN); Rui Xu, Wuhan (CN); Xiaolong Ma, Wuhan (CN); Li Xin, Wuhan (CN); Yingyao Qin, Wuhan (CN)

(73) Assignee: INSTITUTE OF ROCK AND SOIL MECHANICS, CHINESE ACADEMY OF SCIENCES, Wuhan (CN)

( * ) Notice: Subject to any disclaimer, the term of this patent is extended or adjusted under 35 U.S.C. 154(b) by 111 days.

(21) Appl. No.: 18/537,566

(22) Filed: Dec. 12, 2023

(65) Prior Publication Data
US 2025/0092625 A1    Mar. 20, 2025

(30) Foreign Application Priority Data
Sep. 15, 2023    (CN) .......................... 202311198257.8

(51) Int. Cl.
    *E02D 3/12*    (2006.01)
    *F24S 10/50*    (2018.01)
(52) U.S. Cl.
    CPC .............. *E02D 3/12* (2013.01); *F24S 10/501* (2018.05)
(58) Field of Classification Search
    CPC .. E02D 3/12; E02D 19/12; F24S 20/60; F24S 20/61; F24S 20/10; F24S 50/10
    See application file for complete search history.

(56) References Cited

U.S. PATENT DOCUMENTS

| 4,054,125 A * | 10/1977 | Eckels ..................... F24S 60/00 126/633 |
| 4,237,865 A * | 12/1980 | Lorenz ...................... E04B 1/74 126/599 |

(Continued)

FOREIGN PATENT DOCUMENTS

| CA | 2433925 A1 * | 1/2005 | ............... F24S 20/61 |
| CN | 204513808 U * | 7/2015 | ............... E02D 3/10 |

(Continued)

OTHER PUBLICATIONS

CN 204513808 English Translation (Year: 2015).*
CN212756080 English Translation (Year: 2021).*
KR 20240176266 English Translation (Year: 2024).*

*Primary Examiner* — Jong-Suk (James) Lee
(74) *Attorney, Agent, or Firm* — Platinum Intellectual Property PC

(57) ABSTRACT

A device and method for collecting heat bags and solidifying and filling calcareous sand foundation, belonging to the field of civil engineering geological treatment technology. The solar heat collection bag comprises a transparent and permeable part and an insulation material, wherein the insulation material comprises a heat absorbing layer, an insulation layer, and a fabric layer. The heat absorbing layer, insulation layer, and fabric layer are fixedly combined from top to bottom to form an integrated transparent and permeable part. The edge of the transparent and permeable part is the first edge, and the edge of the insulation material is the second edge; The transparent heat permeable part and insulation material are combined into one through the first and second edges, forming a containment space between the transparent heat permeable part and the insulation material, so that the medium contained in the containment space can be heated by solar energy. The device includes a water intake component, a solar collector bag, and a water injection component.

(Continued)

This method is implemented based on the device. This device and method can significantly improve the overall strength, liquefaction resistance, and seepage characteristics of calcareous sand foundation, with low cost and high application prospects.

19 Claims, 2 Drawing Sheets

(56) References Cited

U.S. PATENT DOCUMENTS

| | | | | |
|---|---|---|---|---|
| 4,485,804 A | * | 12/1984 | Sharpe | F24S 40/53 |
| | | | | 165/135 |
| 5,052,387 A | * | 10/1991 | Natali | A61F 7/10 |
| | | | | 607/108 |
| 7,197,893 B2 | * | 4/2007 | Trinh | A61F 7/103 |
| | | | | 62/457.2 |

FOREIGN PATENT DOCUMENTS

| | | | | |
|---|---|---|---|---|
| CN | 212756080 U | * | 3/2021 | E02D 3/10 |
| CN | 115450197 B | * | 12/2023 | E02D 3/10 |
| DE | 10306532 A1 | * | 6/2004 | F24J 2/0483 |
| KR | 101411601 B1 | * | 6/2014 | E02D 3/12 |
| KR | 20240176266 A | * | 12/2024 | E02D 3/12 |
| WO | WO-2005008145 A1 | * | 1/2005 | F24S 20/61 |
| WO | WO-2014155161 A1 | * | 10/2014 | F24J 2/0007 |

* cited by examiner

```
┌─────────────────────────────────────────────────────────┐
│  After the seawater at room temperature between 15 °C   │
│  and 25 °C passes through the water intake component,   │
│    enterthe storage space of the solar collector bag (9)│
└─────────────────────────────────────────────────────────┘
                            │
                            ▼
┌─────────────────────────────────────────────────────────┐
│  The seawater in the storage space of the solar collector bag│
│      (9) is heated by solar energy to form high-temperature  │
│  seawater with a temperature ranging from 50 °C to 70 °C │
└─────────────────────────────────────────────────────────┘
                            │
                            ▼
┌─────────────────────────────────────────────────────────┐
│   The high-temperature seawater is injected into the loose  │
│      calcareous sand formation through a water injection    │
│   component, reducing the solubility of calcium carbonate   │
│   in the loose calcareous sand formation and continuously   │
│   generating calcium carbonate precipitation in the pores   │
│            of the calcareous sand formation                 │
└─────────────────────────────────────────────────────────┘
```

HEAT COLLECTION BAG, DEVICE AND METHOD FOR SOLIDIFYING AND FILLING CALCIUM SAND FOUNDATION

TECHNOLOGY FIELD

The present invention relates to the field of civil engineering geological treatment technology, in particular to a device and method for collecting heat bags, solidifying and filling calcareous sand foundation.

BACKGROUND TECHNOLOGY

Calcareous sand is a special geological material formed by sedimentation and weathering of the remains of reef building organisms such as coral, algae, and shells. It is widely distributed in shallow waters of tropical and subtropical regions. The main chemical component of calcareous sand is calcium carbonate, which usually contains up to 90%. Especially in coral islands and reefs far from the mainland, calcareous sand is the most economical and environmentally friendly engineering construction material, widely used for hydraulic fill foundations and concrete aggregates. However, in real life, the safety factor of calcareous sand in pile foundation engineering is relatively low, which can easily cause serious economic losses.

SUMMARY OF THE INVENTION

In view of this, the present invention provides an insulation material, a heat collection bag, and a device and method for solidifying and filling calcium sand foundation. The heat collection bag can be made from the insulation material, and a device for solidifying and filling calcium sand foundation can be made from the heat collection bag. Based on the device and method for solidifying and filling calcium sand foundation, seawater can be heated by solar energy through the heat collection bag and injected into the loose calcium sand formation, Reducing the solubility of calcium carbonate in loose calcareous sand formations and continuously generating calcium carbonate precipitates in the pores of calcareous sand formations can significantly improve the overall strength, liquefaction resistance, and seepage characteristics of calcareous sand foundations. Moreover, it does not introduce any possible pollutants into the marine environment, consumes less energy, and is more practical.

In order to achieve the first purpose mentioned above, the technical solution of the insulation material provided by the present invention is as follows:

The insulation material provided by the present invention includes a heat absorbing layer (18), an insulation layer (19), and a fabric layer (20), The heat absorbing layer (18), insulation layer (19), and fabric layer (20) are fixedly composite from top to bottom.

The insulation material provided by the present invention can further be achieved by the following technical measures.

As a preferred option, the heat absorbing layer (18) is made of black polymer.

As a preferred option, the insulation layer (18) is made of aluminum based reflective insulation material.

As a preferred option, the fabric layer (20) is made of wear-resistant fabric.

As a preferred option, the fixed composite includes a combination of one or several methods such as stitching, bonding, and tight compaction.

In order to achieve the second objective mentioned above, the technical solution of the heat collection bag provided by the present invention is as follows:

The solar collector bag provided by the present invention includes a transparent heat permeable part (17) and an insulation material provided by the present invention, The edge of the transparent heat permeable part (17) is the first edge, and the edge of the insulation material is the second edge;

The transparent heat permeable part (17) and the insulation material are combined into one through the first and second edges, forming a containment space between the transparent heat permeable part (17) and the insulation material, so that the medium contained in the containment space can be heated by solar energy.

The heat collection bag provided by the present invention can further be achieved by the following technical measures.

As a preferred option, the transparent heat permeable portion (17) is made of ethylene tetrafluoroethylene copolymer material.

As a preferred option, the solar collector bag further comprises an inlet pipeline and an outlet pipeline, The inlet pipeline is connected to one end of the solar collector bag, and the outlet pipeline is connected to the other end of the solar collector bag, so that the storage space is connected to the outside world through the inlet pipeline and outlet pipeline.

As a preferred option, the solar collector bag further comprises a pressure relief valve (8), The pressure relief valve (8) is installed on the solar collector bag, so that excess pressure in the storage space can be relieved through the pressure relief valve (8).

In order to achieve the third objective mentioned above, the technical solution of the device for solidifying and filling calcareous sand foundation provided by the present invention is as follows:

The device for solidifying and filling calcareous sand foundation provided by the present invention includes a water intake component, a solar collector bag (9) provided by the present invention, and a water injection component, The water intake component is connected to the capacity space of the solar collector bag (9), so that seawater obtained through the water intake component can be input into the capacity space of the solar collector bag (9);

The solar collector bag (9) utilizes solar energy to heat the seawater input into the solar collector bag (9), obtaining the heated seawater;

The water injection component is connected to the storage space of the solar collector bag (9), and through the water injection component, heated seawater can be injected into the loose calcareous sand layer, reducing the solubility of calcium carbonate in the loose calcareous sand layer and continuously generating calcium carbonate precipitation in the pores of the calcareous sand layer.

The device for solidifying and filling calcareous sand foundation provided by the present invention can further be achieved by adopting the following technical measures.

As a preferred option, the water intake component comprises a filter screen (4), an impeller group (3), a lifting pipe (2), and a water delivery pipe (5), The filter screen (4) is fixedly installed at the inlet end of the impeller group (3), the inlet end of the lifting pipe (2) is fixedly connected to the outlet end of the impeller group (3), the outlet end of the lifting pipe (2) is fixedly connected to the inlet end of the water delivery pipe (5), and the outlet end of the water delivery pipe (5) is fixedly connected to the inlet pipeline of the solar collector bag (9), so that seawater can pass through the filter screen (4) in sequence After the impeller group (3), the lifting pipe (2), and the water delivery pipe (5) enter the storage space of the solar collector bag (9).

As a preferred option, the device for solidifying and filling calcareous sand foundation also includes a coupling (1), The diameter of the outlet end of the lifting pipe (2) is smaller than the diameter of the inlet end of the water delivery pipe (5), The coupling (1) comprises a first port and a second port, wherein the diameter of the first port is equal to the diameter of the outlet end of the lifting pipe (2), and the diameter of the second port is equal to the diameter of the inlet end of the water delivery pipe (5), The coupling (1) is fixedly connected to the outlet end of the lifting pipe (2) through the first port, and the coupling (1) is fixedly connected to the inlet end of the water delivery pipe (5) through the second port.

As a preferred option, the device for solidifying and filling calcareous sand foundation also includes a pressure regulating valve (6), The pressure regulating valve (6) is installed on the water delivery pipe (5), and is used to regulate the water flow rate inside the water delivery pipe (5).

As a preferred option, the device for solidifying and filling calcareous sand foundation also includes connecting components, The solar collector bag (9) comprises multiple, Multiple solar collectors (9) are connected in series and/or parallel, wherein the multiple solar collectors (9) in series are connected to each other through the connecting member.

As a preferred option, the connecting piece is a flexible water delivery pipe fitting, One end of the flexible water delivery pipe is connected between two adjacent solar collector bags (9), so that the outlet pipeline of the previous solar collector bag (9) in the adjacent two solar collector bags (9) is connected to the inlet pipeline of the latter solar collector bag (9) after passing through the flexible water delivery pipe.

As a preferred option, the device for solidifying and filling calcareous sand foundation also includes connectors, The multiple solar collector bags (9) connected in series are also connected together through the connecting piece.

As a preferred option, the water injection component comprises a water injection pipeline and a water injection component, The inlet end of the water injection pipe is fixedly connected to the outlet pipeline of the solar collector bag (9), and the outlet end of the water delivery pipe is fixedly connected to the water injection piece, so that the seawater heated by solar energy in the storage space of the solar collector bag (9) passes through the water injection pipeline and the water injection piece in sequence and is injected into the loose calcareous sand layer, reducing the solubility of calcium carbonate in the loose calcareous sand layer, Continuous generation of calcium carbonate precipitation in the pores of calcareous sand formations.

As a preferred option, the water injection component comprises multiple,

The water injection component comprises a pipe cap (13) and an end pipe (16), wherein the pipe cap is positioned above one end of the end pipe (16), and the other end of the end pipe (16) has a conical end, There are multiple branches on the water injection pipeline, and the number of branches is the same as the number of water injection components, so that the branches correspond one-to-one with the water injection components, The seawater passing through the water injection pipeline sequentially passes through the branch and end pipes, and is injected into the loose calcareous sand formation from the conical end of the end pipe, reducing the solubility of calcium carbonate in the loose calcareous sand formation and continuously generating calcium carbonate precipitation in the pores of the calcareous sand formation.

As a preferred option, the device for solidifying and filling calcareous sand foundation also includes an extension pipe (14) and a threaded joint (15), The threaded joint (15) is hollow, The extended tube (14) is arranged between the tube cap (13) and the end tube (16), so that the tube cap (13) is connected and connected to the end tube (16) through the threaded joint (15).

As a preferred option, multiple through holes are provided on the pipe walls of the extended tube (14) and the end tube (16).

As a preferred option, the device for solidifying and filling calcareous sand foundation also includes a booster pump (11), The booster pump (11) is installed on the water injection pipeline to increase the flow rate and velocity of seawater output through the water injection pipeline on the original basis.

In order to achieve the fourth objective mentioned above, the technical solution of the method for solidifying and filling calcareous sand foundation provided by the present invention is as follows:

The method for solidifying and filling calcareous sand foundation provided by the present invention is based on the device for solidifying and filling calcareous sand foundation provided by the present invention. The method for solidifying and filling calcareous sand foundation includes the following steps:

After passing through the water intake module, seawater at room temperature between 15° C. and 25° C. enters the storage space of the solar collector bag (9);

The seawater in the storage space of the solar collector bag (9) is heated by solar energy to form high-temperature seawater with a temperature ranging from 50° C. to 70° C.;

The high-temperature seawater is injected into the loose calcareous sand formation through a water injection component, reducing the solubility of calcium carbonate in the loose calcareous sand formation and continuously generating calcium carbonate precipitation in the pores of the calcareous sand formation.

The insulation material provided in the embodiments of the present invention includes a heat absorbing layer 18, an insulation layer 19, and a fabric layer 20, wherein heat can be absorbed through the heat absorbing layer 18; By using insulation layer 19, heat loss can be reduced; By using a fabric layer of 20, the toughness of the insulation material itself can be enhanced, extending its service life.

The transparent and permeable part 17 of the solar energy collection bag provided in the embodiment of the present invention is integrated with the second edge of the insulation material through its first edge. When applied, the transparent and permeable part 17 is arranged towards the sun, and the insulation material is located at the bottom side of the transparent and permeable part 17. In this case, the transparent and permeable part 17 and the insulation material complement each other, It can allow solar radiation heat to enter the storage space formed between the transparent heat permeable part 17 and the insulation material. When the storage space contains the medium to be heated, the medium to be heated can be heated by solar radiation heat.

The device for solidifying and filling calcareous sand foundation provided by the embodiments of the present invention includes a water intake component, a solar collector bag 9 provided by the present invention, and a water injection component. Among them, room temperature seawater can be input into the storage space of the solar collector bag 9 through the water intake component. Under the action of solar radiation heat, room temperature seawater is heated into heated seawater. Finally, through the water injection component, The heated seawater can be injected into the loose calcareous sand layer, reducing the solubility of calcium carbonate in the loose calcareous sand layer and continuously generating calcium carbonate precipitation in the pores of the calcareous sand layer. Therefore, it can improve the overall strength, liquefaction resistance, and seepage characteristics of the calcareous sand foundation, and has extremely high utilization value and economic ecological advantages.

The method for solidifying and filling calcareous sand foundation provided by the embodiments of the present invention is based on the device for solidifying and filling calcareous sand foundation provided by the embodiments of the present invention. After passing through the water intake component of the device for solidifying and filling calcareous sand foundation, seawater at room temperature of 15° C.-25° C. enters the storage space of the solar collector bag of the device for solidifying and filling calcareous sand foundation; The seawater in the storage space of the solar collector bag located in the device for solidifying and filling calcareous sand foundation is heated by solar energy to form high-temperature seawater with a temperature ranging from 50° C. to 70° C.; The high-temperature seawater is injected into the loose calcareous sand formation through the water injection component of the solidification and filling device for calcareous sand foundation, reducing the solubility of calcium carbonate in the loose calcareous sand formation and continuously generating calcium carbonate precipitation in the pores of the calcareous sand formation, which has high utilization value and economic and ecological advantages.

DESCRIPTION OF FIGURES

By reading the detailed description of the preferred implementation methods in the following text, various other advantages and benefits will become clear to ordinary technical personnel in this field. The accompanying drawings are only intended to illustrate preferred embodiments and are not considered a limitation of the present invention. And throughout the entire diagram, the same reference symbols are used to represent the same components. In the attached figure:

FIG. 3 is a step-by-step flowchart of the method for solidifying and filling calcareous sand foundation provided in an embodiment of the present invention.

EMBODIMENT

Figure 1:
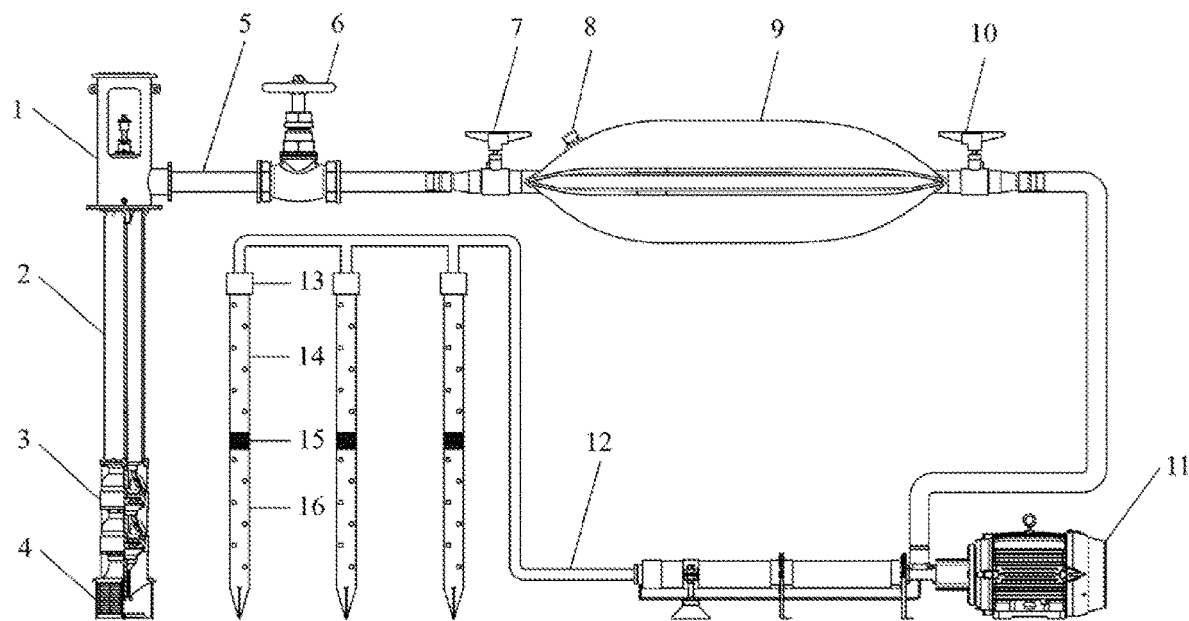
FIG. 1 is a schematic diagram of the overall structure of the device for solidifying and filling calcareous sand foundation provided in an embodiment of the present invention.

In view of this, the present invention provides an insulation material, a heat collection bag, and a device and method for solidifying and filling calcium sand foundation. The heat collection bag can be made from the insulation material, and a device for solidifying and filling calcium sand foundation can be made from the heat collection bag. Based on the device and method for solidifying and filling calcium sand foundation, seawater can be heated by solar energy through the heat collection bag and injected into the loose calcium sand formation, Reducing the solubility of calcium carbonate in loose calcareous sand formations and continuously generating calcium carbonate precipitates in the pores of calcareous sand formations can significantly improve the overall strength, liquefaction resistance, and seepage characteristics of calcareous sand foundations. Moreover, it does not introduce any possible pollutants into the marine environment, consumes less energy, and is more practical.

After arduous efforts, the inventor discovered that,

The solubility difference of calcium carbonate at different temperatures is controlled by controlling the changes in temperature, pressure, flow rate, and other states of seawater during circulation, which enables the continuous and stable formation of calcium carbonate precipitation during the injection of seawater into the interior of islands, reefs, and reefs. This fills the pore space inside and between calcium sand particles, improves the physical, mechanical, and engineering properties of calcium sand particles and calcium sand soil, especially the overall strength of calcium sand foundation Anti liquefaction performance and seepage characteristics.

Calcium sand particles have typical physical and mechanical properties such as irregular shape, high angle, developed internal pores, and particle fragmentation, which are significantly different from widely used terrestrial materials such as quartz sand. Especially in pile foundation engineering, the hydraulic filled calcareous sand foundation exhibits extremely low pile side friction, causing serious economic losses. This is mainly due to the low strength of calcareous sand particles, which are prone to particle breakage during the pile formation process.

Coral islands and reefs grow on top of volcanic bedrock, forming a special binary geological structure consisting of coral reef limestone with a thickness of up to several kilometers in the lower part and coral calcareous sand with unconsolidated or weakly cemented surface. Coral islands and reefs typically include four geomorphic units in the horizontal direction: seaward slope, outer reef flat, inner reef flat, and lagoon. Some coral islands and reefs may also develop stable exposed gray sand island geomorphic units on their inner reef flat. Among them, the inner reef flat has a wide area, relatively flat terrain, and stable hydrodynamic conditions, making it the most suitable area for engineering construction. However, the surface of the inner reef is located in the intertidal zone, which is submerged during high tide and exposed to the sea during low tide. Therefore, it is necessary to artificially fill a certain thickness of accumulation on the inner reef, that is, to carry out island and reef reclamation, so that the surface of the inner reef is higher than the local highest tide level, in order to carry out engineering construction on it and ensure that buildings and structures are not affected by waves. Before filling islands and reefs, it is necessary to first set up steel cylindrical cofferdams around the filling area and weld them as a whole, which can provide a relatively stable marine dynamic environment and reduce the loss of the filling material under the dynamic effects of waves and ocean currents. In the process of island and reef reclamation, the cutter suction boat obtains loose sand material by cutting and crushing the reefs, and can also directly utilize natural calcareous sand in environments such as lagoons, pump it together with seawater, and backfill it into the cofferdam. After the hydraulic fill reaches the predetermined depth, the preliminary formation of the hydraulic fill calcareous sand foundation still requires further treatment using engineering techniques such as compaction and vibration compaction, with the main purpose of improving the compactness and bearing capacity of the foundation. However, at this time, the filled calcareous sand foundation still exhibits characteristics such as loose or weakly cemented, high initial moisture content, liquefiability, and weak pile-soil interaction, which cannot be directly used for island and reef engineering construction. Therefore, it is necessary to reinforce the calcareous sand formation.

Solar energy is an inexhaustible source of clean and renewable energy, and there is no carbon emissions or other environmental pollution during its utilization. The reserves of solar energy are enormous. Based on the total annual solar radiation, the global surface is divided into resource rich areas, resource rich areas, resource available areas, and resource scarce areas. Due to the influence of factors such as solar incidence angle and atmospheric dissipation, solar energy resources are mainly distributed in low latitude tropical and subtropical regions, roughly the same latitude range as coral reefs. This provides a good material basis for the large-scale utilization of solar energy resources in coral islands and reefs. At present, the main way of utilizing solar energy is to convert solar radiation energy into various forms such as thermal energy, electrical energy, and chemical energy for storage, transportation, and utilization. Among them, using solar collectors to convert solar energy into thermal energy for direct utilization results in relatively less energy loss, and the efficiency of photothermal conversion can exceed 80%. Therefore, it can be considered that coral islands and reefs usually have abundant solar energy resources. The photothermal conversion of solar energy has extremely high utilization value and economic and ecological advantages in island and reef engineering construction, especially in improving the overall strength, liquefaction resistance, and seepage characteristics of calcareous sand foundations.

In order to further elaborate on the technical means and effects adopted by the present invention to achieve the predetermined invention purpose, the following is a detailed explanation of the device and method proposed based on the present invention, including an insulation material, a heat collection bag, and a solidified and filled calcium sand foundation, along with its specific implementation method, structure, features, and effects, in conjunction with the accompanying drawings and preferred embodiments. In the following explanation, different "embodiments" or "embodiments" may not necessarily refer to the same embodiment. In addition, specific features, structures, or features in one or more embodiments may be combined in any suitable form.

The term "and/or" in this article is only a description of the association relationship between related objects, indicating that there can be three types of relationships, such as A and/or B. It can be understood as: it can contain both A and B, can exist alone A, can exist alone B, and can have any of the three situations mentioned above.

Thermal Insulation Materials

Figure 2:
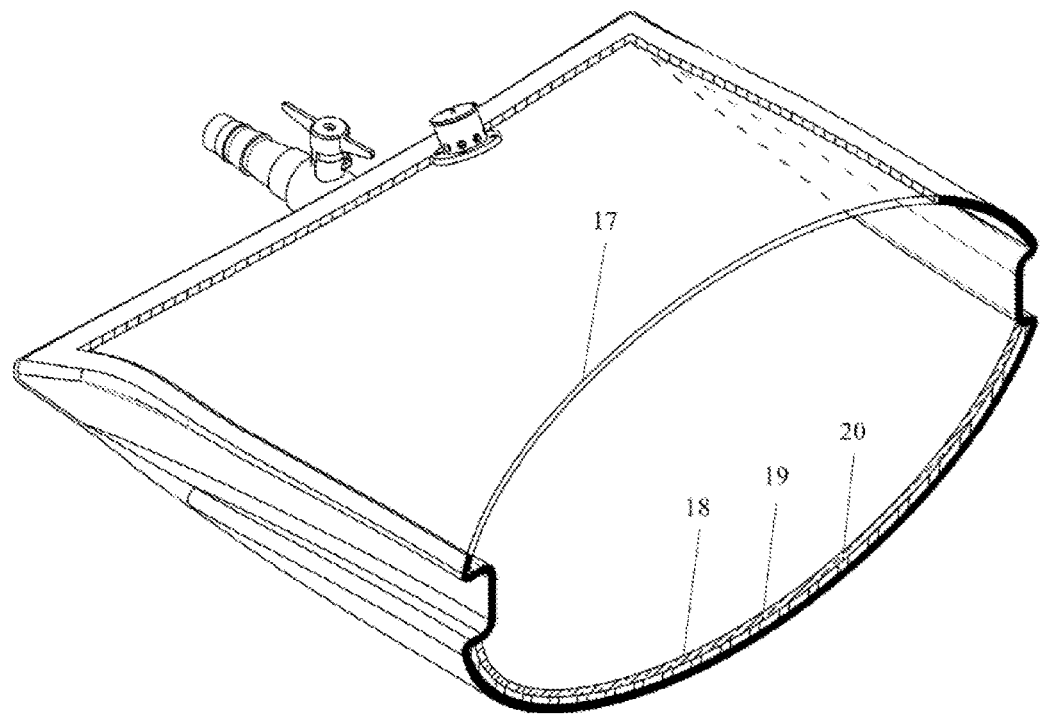
FIG. 2 is a schematic diagram of the cross-sectional structure of the heat collection bag provided in an embodiment of the present invention.

Referring to FIG. 2, the insulation material provided in the embodiment of the present invention includes a heat absorbing layer 18, an insulation layer 19, and a fabric layer 20. The heat absorbing layer 18, insulation layer 19, and fabric layer 20 are fixed and composite from top to bottom.

The insulation material provided in the embodiments of the present invention includes a heat absorbing layer 18, an insulation layer 19, and a fabric layer 20, wherein heat can be absorbed through the heat absorbing layer 18; By using insulation layer 19, heat loss can be reduced; By using a fabric layer of 20, the toughness of the insulation material itself can be enhanced, extending its service life.

Among them, the heat absorbing layer 18 is made of black polymer. In this case, the black polymer absorbs most of the visible light and reflects very little. Since it absorbs most of the light, it also absorbs most of the heat. Therefore, using black polymer to make a heat absorbing layer 18 can improve the heat absorption efficiency.

Among them, the insulation layer 18 is made of aluminum based reflective insulation material. In this case, aluminum based reflective insulation materials can effectively handle heat dissipation problems, alleviate the thermal expansion and contraction problems of different substances, and improve durability and reliability.

Among them, the fabric layer 20 is made of wear-resistant fabric. In this case, the fabric has a certain toughness, but in order to improve the service life of the insulation material during use, its wear resistance should also be increased. The wear resistance of the fabric refers to its ability to resist wear. Wear refers to the phenomenon where a fabric is gradually damaged due to repeated friction from other objects during use, Among them, fixed composite includes a combination of one or several methods such as stitching, bonding, and tight compaction. In this situation, it can increase the integration of the insulation material itself and reduce the difficulty of its composite with other materials.

Solar Collector Bag

Referring to FIG. 2, the solar collector bag provided in the embodiment of the present invention includes a transparent heat permeable portion 17 and the insulation material provided in the present invention. The edge of the transparent heat permeable part 17 is the first edge, and the edge of the insulation material is the second edge. The transparent heat permeable part 17 and the insulation material are combined into one through the first and second edges, forming a containment space between the transparent heat permeable part 17 and the insulation material, so that the medium contained in the containment space can be heated by solar energy.

The transparent and permeable part 17 of the solar energy collection bag provided in the embodiment of the present invention is integrated with the second edge of the insulation material through its first edge. When applied, the transparent and permeable part 17 is arranged towards the sun, and the insulation material is located at the bottom side of the transparent and permeable part 17. In this case, the transparent and permeable part 17 and the insulation material complement each other, It can allow solar radiation heat to enter the storage space formed between the transparent heat permeable part 17 and the insulation material. When the storage space contains the medium to be heated, the medium to be heated can be heated by solar radiation heat.

Among them, the transparent heat permeable part 17 is made of ethylene tetrafluoroethylene copolymer material. Ethylene tetrafluoroethylene copolymer is a chemical substance, and ETFE is the strongest and toughest fluoroplastic. It maintains the good heat resistance, chemical resistance, and electrical insulation properties of PTFE, while greatly improving its radiation and mechanical properties. The tensile strength can reach 50 MPa, which is close to twice that of polytetrafluoroethylene. Long term use temperature −80 to −220 degrees C., excellent chemical corrosion resistance, corrosion resistance to all chemicals, lowest friction coefficient among plastics, and excellent electrical performance. Its electrical insulation is not affected by temperature. Its chemical resistance is similar to that of polytetrafluoroethylene, but better than that of vinylidene fluoride. Its creep resistance and compressive strength are better than polytetrafluoroethylene, with high tensile strength and an elongation rate of 100-300%. Good dielectric properties and excellent radiation resistance. ETFE has good processing and formability, balanced physical properties, good mechanical toughness, and excellent radiation resistance. This material has the corrosion resistance characteristics of polytetrafluoroethylene, overcoming the non stick and sexual defects of polytetrafluoroethylene on metals. In addition, its average linear expansion coefficient is close to that of carbon steel, making ETFE (F-40) an ideal composite material for metals.

Among them, the solar collector bag also includes an inlet pipeline and an outlet pipeline. The inlet pipeline is connected to one end of the solar collector bag, and the outlet pipeline is connected to the other end of the solar collector bag, so that the storage space is connected to the outside world through the inlet and outlet pipelines. In this case, the solar collector bag can communicate with the outside world through the inlet and outlet pipelines, receive the medium to be heated in real time, and flow out the medium to be heated. Therefore, it can continuously heat the medium to be heated and achieve continuous operation.

Among them, the solar collector bag 9 also includes a pressure relief valve 8. Pressure relief valve 8 is installed on the solar collector bag 9, allowing excess pressure in the storage space to be relieved through pressure relief valve 8. In this case, before inputting the medium to be heated into the solar collector bag 9, there is air inside the solar collector bag 9. As the capacity of the storage space of the solar collector bag 9 itself is determined, the amount of material n originally contained in the air is also determined. After the storage space of solar collector bag 9 is filled with the medium to be heated, the storage space originally occupied by air is squeezed by the medium to be heated. According to the ideal gas state equation $pV=nRT$, where p—gas pressure, Pa; V—Gas volume, m3; R—gas constant, J/(mol·K); The temperature of the T-system, K, indicates that for the determined solar collector bag 9, n and R remain constant. T increases with solar heating, and the nRT on the right side of the ideal gas state equation also increases with solar heating. However, on the left side of the ideal gas state equation, V decreases due to the introduction of the medium to be heated. Therefore, as the medium to be heated continuously enters the solar collector bag 9, The pressure inside the solar collector bag 9 will not only increase, but the amount of increase will also increase more with the increase of the medium to be heated and the heating temperature. Therefore, setting a pressure relief valve 8 on the solar collector bag 9 can release the gas inside and avoid safety accidents caused by excessive pressure.

Device for Solidifying and Filling Calcium Sand Foundation

Referring to FIG. 1, the device for solidifying and filling calcareous sand foundation provided in the embodiment of the present invention includes a water intake component, a solar collector bag 9 provided in the present invention, and a water injection component. The water intake component is connected to the storage space of the solar collector bag 9, so that the seawater obtained through the water intake component can be input into the storage space of the solar collector bag 9. The solar collector bag 9 utilizes solar energy to heat the seawater input into the solar collector bag 9, obtaining the heated seawater. The water injection component is connected to the storage space of the solar collector bag 9. Through the water injection component, the heated seawater can be injected into the loose calcareous sand layer, reducing the solubility of calcium carbonate in the loose calcareous sand layer and continuously generating calcium carbonate precipitation in the pores of the calcareous sand layer.

The device for solidifying and filling calcareous sand foundation provided by the embodiments of the present invention includes a water intake component, a solar collector bag 9 provided by the present invention, and a water injection component. Among them, room temperature seawater can be input into the storage space of the solar collector bag 9 through the water intake component. Under the action of solar radiation heat, room temperature seawater is heated into heated seawater. Finally, through the water injection component, The heated seawater can be injected into the loose calcareous sand layer, reducing the solubility of calcium carbonate in the loose calcareous sand layer and continuously generating calcium carbonate precipitation in the pores of the calcareous sand layer. Therefore, it can improve the overall strength, liquefaction resistance, and seepage characteristics of the calcareous sand foundation, and has extremely high utilization value and economic ecological advantages. In this implementation, the length of the solar collector bag 9 is 3 m, the width is 2 m, the height is 0.4 m, the water storage capacity is 2 m3, and the maximum allowable pressure is 200 kPa.

Among them, the water intake components include filter screen 4, impeller group 3, lifting pipe 2, and water delivery pipe 5. Filter screen 4 is fixedly installed at the inlet end of impeller group 3, the inlet end of lifting pipe 2 is fixedly connected to the outlet end of impeller group 3, the outlet end of lifting pipe 2 is fixedly connected to the inlet end of water delivery pipe 5, and the outlet end of water delivery pipe 5 is fixedly connected to the inlet pipeline of solar collector bag 9, so that seawater can pass through filter screen 4, impeller group 3, lifting pipe 2, and water delivery pipe 5 in sequence and enter the storage space of solar collector bag 9. In this case, impurities in seawater can be filtered out through filter screen 4, negative pressure can be generated through impeller group 3, allowing seawater to be smoothly drawn into lifting pipe 2. Then, through water delivery pipe 5, the flow rate of the seawater to be heated entering the solar collector bag 9 can be stabilized. In this embodiment, impeller group 3 is made of 316L molybdenum containing stainless steel material, with a two-stage impeller design. The inlet and outlet diameters are 100-200 mm, the rated flow rate is 300 m3/h, and the rated head is 50 m. The total length of the seawater circulation pump is 10-12 m, and the installation position of the filter screen is 4-5 m below the minimum water level.

Among them, the device for solidifying and filling calcareous sand foundation also includes coupling 1. The diameter of the outlet end of water pipe 2 is smaller than the diameter of the inlet end of water pipe 5. Coupling 1 includes a first port and a second port. The diameter of the first port is equal to the diameter of the outlet end of water pipe 2, and the diameter of the second port is equal to the diameter of the inlet end of water pipe 5. Coupling 1 is fixedly connected to the outlet end of water pipe 2 through the first port, and coupling 1 is fixedly connected to the inlet end of water pipe 5 through the second port. In this case, coupling 1 can reduce the diameter of water pipe 5, allowing seawater in lifting pipe 2 to flow more smoothly into the solar collector bag 9.

Among them, the device for solidifying and filling calcareous sand foundation also includes a pressure regulating valve 6. Pressure regulating valve 6 is installed on the water delivery pipe 5, which is used to regulate the water flow inside the water delivery pipe 5. In this case, it is possible to control the opening of pressure regulating valve 6 to control the water flow rate inside the water delivery pipe 5, making the working state of the solar collector bag 9 more stable. In this embodiment, the pressure of seawater in the water delivery pipe 5 and the solar collector bag 9 is controlled by the pressure regulating valve 6 to not exceed 200 kPa.

Among them, the device for solidifying and filling calcareous sand foundation also includes connecting components. The solar energy collection bag 9 comprises multiple solar energy collection bags 9, which are connected in series and/or parallel with each other. Among them, the multiple solar energy collection bags 9 in series are connected to each other through connecting pieces. In this case, the number of solar collector bags 9 can be reasonably set according to the actual project scale.

Among them, the connecting piece is a flexible water delivery pipe fitting. One end of the flexible water supply pipe is connected between two adjacent solar collector bags 9, so that the outlet pipeline of the previous solar collector bag 9 is connected to the inlet pipeline of the latter solar collector bag 9 after passing through the flexible water supply pipe. In this case, it is possible to ensure that seawater can be conveniently filled and passed through the adjacent solar collector bags 9 connected in series.

Among them, the device for solidifying and filling calcareous sand foundation also includes connectors. The multiple solar collector bags 9 connected in series are also connected together through connectors. In this case, it is possible to ensure the reliability of the connection of multiple solar collector bags 9, and even if there is a connection risk with the connecting components, it can avoid the occurrence of connection safety accidents.

Among them, the water injection components include water injection pipelines and water injection components. The inlet end of the water injection pipe is fixedly connected to the outlet pipeline of the solar energy collection bag 9, and the outlet end of the water delivery pipe is fixedly connected to the water injection component, so that the seawater heated by solar energy in the storage space of the solar energy collection bag 9 is sequentially injected into the loose calcareous sand formation through the water injection pipeline and water injection component, reducing the solubility of calcium carbonate in the loose calcareous sand formation, Continuous generation of calcium carbonate precipitation in the pores of calcareous sand formations. In this embodiment, the water injection component comprises multiple. The water injection component includes a pipe cap 13 and an end pipe 16. The pipe cap is placed on one end of the end pipe 16, and the other end of the end pipe 16 has a conical end. There are multiple branches on the water injection pipeline, and the number of branches is the same as the number of water injection components, so that the branches correspond one-to-one with the water injection components. The seawater passing through the water injection pipeline passes through the branches and end pipes in sequence, and is injected into the loose calcareous sand layer from the conical end of the end pipe, This reduces the solubility of calcium carbonate in loose calcareous sand formations and continuously generates calcium carbonate precipitates in the pores of calcareous sand formations. In this case, by using the conical end of the water injection end pipe 16, seawater can be more conveniently filled into the pores between calcareous sand particles. In this embodiment, the pipe cap and end pipe 16 are made of stainless steel material.

Among them, the device for solidifying and filling calcareous sand foundation also includes an extension pipe 14 and a threaded joint 15. The threaded joint 15 is hollow, and the extended pipe 14 is set between the pipe cap 13 and the end pipe 16, so that the pipe cap 13 is connected and connected to the end pipe 16 through the threaded joint 15. In this case, by extending the pipe 14, the length of the water injection part can be extended, making the device for solidifying and filling calcareous sand foundation provided in the embodiments of the present invention more widely applicable. In this embodiment, the extension pipe 14 can have multiple length specifications and can be combined according to the depth of the foundation to be reinforced.

Among them, there are multiple through holes on the wall of the extended tube 14 and the end tube 16. In this case, not only is seawater more conveniently filled into the pores between calcareous sand particles through the conical end of the water injection end pipe 16, but seawater can also be filled into the pores between calcareous sand particles through multiple through holes set on the pipe wall, resulting in higher filling efficiency. In this embodiment, the total length of the water injection component is 4 m, the diameter of the extended pipe 14 and the end pipe 16 is 108 mm, and the planar layout is a plum blossom shape with a horizontal spacing of 5 m. The diameter of the through-hole is 10 mm and it is arranged in a spiral shape.

Among them, the device for solidifying and filling calcareous sand foundation also includes a booster pump 11. Booster pump 11 is installed on the water injection pipeline to increase the flow rate and velocity of seawater output through the injection pipeline on the original basis. In this case, it can further improve the filling efficiency of seawater in the pores between calcareous sand particles. In this embodiment, the output pressure of seawater in the solar collector bag 9 can be increased to 300-500 kPa through the booster pump 11.

The Method of Solidifying and Filling Calcareous Sand Foundation

Referring to FIG. 3, the method for solidifying and filling calcareous sand foundation provided by the embodiments of the present invention is based on the device for solidifying and filling calcareous sand foundation provided by the present invention. The method for solidifying and filling calcareous sand foundation includes the following steps:

Step S1: After passing through the water intake module, seawater at room temperature between 15° C. and 25° C. enters the storage space of the solar collector bag 9;

Step S2: The seawater in the storage space of the solar collector bag 9 is heated by solar energy to form high-temperature seawater with a temperature ranging from 50° C. to 70° C.;

Step S3: High temperature seawater is injected into the loose calcareous sand formation through the water injection component, reducing the solubility of calcium carbonate in the loose calcareous sand formation and continuously generating calcium carbonate precipitation in the pores of the calcareous sand formation.

The method for solidifying and filling calcareous sand foundation provided by the embodiments of the present invention is based on the device for solidifying and filling calcareous sand foundation provided by the embodiments of the present invention. After passing through the water intake component of the device for solidifying and filling calcareous sand foundation, seawater at room temperature of 15° C.-25° C. enters the storage space of the solar collector bag of the device for solidifying and filling calcareous sand foundation; The seawater in the storage space of the solar collector bag located in the device for solidifying and filling calcareous sand foundation is heated by solar energy to form high-temperature seawater with a temperature ranging from 50° C. to 70° C.; The high-temperature seawater is injected into the loose calcareous sand formation through the water injection component of the solidification and filling device for calcareous sand foundation, reducing the solubility of calcium carbonate in the loose calcareous sand formation and continuously generating calcium carbonate precipitation in the pores of the calcareous sand formation, which has high utilization value and economic and ecological advantages.

On the surface of coral reef flats, solar thermal collection bags with heating, insulation, water storage, and circulation functions are laid. Depending on the actual situation of the project, solar thermal collection bags can be used alone or in combination with multiple solar thermal collection bags to form a heating array. By setting seawater circulation pumps at the edge of coral islands or at any location near the area to be reinforced, usually vertical long axis pumps made of corrosion-resistant molybdenum stainless steel materials, low-temperature seawater at a certain depth below the sea surface is extracted into solar energy collection bags laid on the reef surface, utilizing the abundant solar energy resources in tropical regions and the temperature difference between the deep sea and the surface, Continuously heat the low-temperature seawater in the solar collector bag. Due to the increase in seawater temperature, the solubility of calcium carbonate decreases. When seawater with higher temperature is injected into the calcareous sand formation through water injection, the temperature of the surface seawater inside the reef increases, leading to a decrease in the solubility of calcium carbonate and the formation of calcium carbonate precipitation. As the hot mixed seawater inside the reef continuously flows out and is replaced by natural low-temperature seawater, and the high-temperature seawater heated by solar energy in the solar collector bag is continuously injected through water injection components, the temperature of the high-temperature seawater gradually decreases while the temperature of the low-temperature seawater gradually increases. Calcium carbonate continuously dissolves and precipitates, and its spatial position changes with the movement of seawater. In addition, the dissolution of calcium carbonate is considered to occur equally at the interface between water and solid, while the precipitation process of calcium carbonate usually occurs preferentially on the rough surface of calcareous sand particles, the pores within the particles, and the contact positions between adjacent particles, before gradually filling the pores between calcareous sand particles. Therefore, solid calcium carbonate can: (1) fill the internal pores of calcium sand particles, improve the mechanical properties of individual calcium sand particles, and reduce the occurrence of particle breakage; (2) By depositing connecting bonds between adjacent calcareous sand particles, the pore space between particles is further filled, significantly improving the overall strength, liquefaction resistance, and seepage characteristics of the calcareous sand foundation.

Although preferred embodiments of the present invention have been described, those skilled in the art may make additional changes and modifications to these embodiments once they have knowledge of the basic creative concepts. Therefore, the attached claims are intended to be interpreted as including preferred embodiments and all changes and modifications falling within the scope of the present invention.

Obviously, technicians in this field can make various modifications and variations to the present invention without departing from the spirit and scope of the present invention. In this way, if these modifications and variations of the present invention fall within the scope of the claims and their equivalent technologies, the present invention is also intended to include these modifications and variations.

The invention claimed is:

1. A device for solidifying and filling calcareous sand foundation, comprising:
    a solar energy collection bag, comprises a transparent heat permeable part (17) and insulation material, the insulation material comprises a heat absorbing layer (18), an insulation layer (19), and a fabric layer (20), wherein the heat absorbing layer (18), the insulation layer (19), and the fabric layer (20) are fixedly composite from top to bottom into one body;
    the edge of the transparent heat permeable part (17) is the first edge, and the edge of the insulation material is the second edge;
    the transparent heat permeable part (17) and the insulation material are combined into one through the first and second edges, forming a containment space between the transparent heat permeable part (17) and the insulation material, so that the medium contained in the containment space can be heated by solar energy;
    a water intake component that is connected to the capacity space of the solar collector bag (9), so that seawater obtained through the water intake component can be input into the capacity space of the solar collector bag (9), wherein the solar collector bag (9) utilizes solar energy to heat the seawater input into the solar collector bag (9), obtaining the heated seawater; and
    a water injection component that is connected to the storage space of the solar collector bag (9), and through the water injection component, heated seawater can be injected into the loose calcareous sand layer, reducing the solubility of calcium carbonate in the loose calcareous sand layer and continuously generating calcium carbonate precipitation in the pores of the calcareous sand layer.

2. The device of claim 1, wherein the heat absorbing layer (18) is made of black polymer; The insulation layer (19) is made of aluminum based reflective insulation material.

3. The device of claim 1, wherein the fabric layer (20) is made of wear-resistant fabric.

4. The device of claim 1, wherein the fixed composite comprises a combination of one or more methods of stitching, bonding, and tight compaction.

5. The device of claim 1, wherein the transparent and permeable part (17) is made of ethylene tetrafluoroethylene copolymer material.

6. The device of claim 1, further comprising an inlet pipeline and an outlet pipeline,
    The inlet pipeline is connected to one end of the solar collector bag, and the outlet pipeline is connected to the other end of the solar collector bag, so that the storage space is connected to the outside world through the inlet pipeline and outlet pipeline.

7. The device of claim 1, further comprising a pressure relief valve (8), The pressure relief valve (8) is installed on the solar collector bag, so that excess pressure in the storage space can be relieved through the pressure relief valve (8).

8. The device for solidifying and filling calcareous sand foundation according to claim 1, wherein the water intake component comprises a filter screen (4), an impeller group (3), a lifting pipe (2), and a water delivery pipe (5), The filter screen (4) is fixedly installed at the inlet end of the impeller group (3), the inlet end of the lifting pipe (2) is fixedly connected to the outlet end of the impeller group (3), the outlet end of the lifting pipe (2) is fixedly connected to the inlet end of the water delivery pipe (5), and the outlet end of the water delivery pipe (5) is fixedly connected to the inlet pipeline of the solar collector bag (9), so that seawater can pass through the filter screen (4) in sequence After the impeller group (3), the lifting pipe (2), and the water delivery pipe (5) enter the storage space of the solar collector bag (9).

9. The device for solidifying and filling calcareous sand foundation according to claim 8, further comprising a coupling (1), The diameter of the outlet end of the lifting pipe (2) is smaller than the diameter of the inlet end of the water delivery pipe (5), The coupling (1) comprises a first port and a second port, wherein the diameter of the first port is equal to the diameter of the outlet end of the lifting pipe (2), and the diameter of the second port is equal to the diameter of the inlet end of the water delivery pipe (5), The coupling (1) is fixedly connected to the outlet end of the lifting pipe (2) through the first port, and the coupling (1) is fixedly connected to the inlet end of the water delivery pipe (5) through the second port.

10. The device for solidifying and filling calcareous sand foundation according to claim 8, further comprises comprising a pressure regulating valve (6), The pressure regulating valve (6) is installed on the water delivery pipe (5), and is used to regulate the water flow rate inside the water delivery pipe (5).

11. The device for solidifying and filling calcareous sand foundation according to claim 8, wherein the water injection component comprises a water injection pipeline and a water injection piece, The inlet end of the water injection pipe is fixedly connected to the outlet pipeline of the solar collector bag (9), and the outlet end of the water delivery pipe is fixedly connected to the water injection piece, so that the seawater heated by solar energy in the storage space of the solar collector bag (9) passes through the water injection pipeline and the water injection piece in sequence and is injected into the loose calcareous sand layer, reducing the solubility of calcium carbonate in the loose calcareous sand layer, Continuous generation of calcium carbonate precipitation in the pores of calcareous sand formations.

12. The device for solidifying and filling calcareous sand foundation according to claim 11, wherein the water injection component comprises multiple water injection pieces, The water injection component comprises a pipe cap (13) and an end pipe (16), wherein the pipe cap is positioned above one end of the end pipe (16), and the other end of the end pipe (16) has a conical end, There are multiple branches on the water injection pipeline, and the number of branches is the same as the number of water injection parts, so that the branches correspond one-to-one with the water injection parts, The seawater passing through the water injection pipeline sequentially passes through the branch and end pipes, and is injected into the loose calcareous sand formation from the conical end of the end pipe, reducing the solubility of calcium carbonate in the loose calcareous sand formation and continuously generating calcium carbonate precipitation in the pores of the calcareous sand formation.

13. The device for solidifying and filling calcareous sand foundation according to claim 12, further comprising an extension pipe (14) and a threaded joint (15), The threaded joint (15) is hollow, The extended tube (14) is arranged between the tube cap (13) and the end tube (16), so that the tube cap (13) is connected and connected to the end tube (16) through the threaded joint (15).

14. The device for solidifying and filling calcareous sand foundation according to claim 13, wherein multiple through holes are provided on the pipe walls of the extended pipe (14) and the end pipe (16).

15. The device for solidifying and filling calcareous sand foundation according to claim 11, further comprising a booster pump (11), The booster pump (11) is installed on the water injection pipeline to increase the flow rate and velocity of seawater output through the water injection pipeline on the original basis.

16. The device for solidifying and filling calcareous sand foundation according to claim 1, further comprising connecting pieces, The solar collector bag (9) comprises multiple, Multiple solar collectors (9) are connected in series and/or parallel, wherein the multiple solar collectors (9) in series are connected to each other through the connecting member.

17. The device for solidifying and filling calcareous sand foundation according to claim 16, wherein the connecting piece is a flexible water delivery pipe fitting, One end of the flexible water delivery pipe is connected between two adjacent solar collector bags (9), so that the outlet pipeline of the previous solar collector bag (9) in the adjacent two solar collector bags (9) is connected to the inlet pipeline of the latter solar collector bag (9) after passing through the flexible water delivery pipe.

18. The device for solidifying and filling calcareous sand foundation according to claim 17, further comprising connecting pieces, The multiple solar collector bags (9) connected in series are also connected together through the connecting piece.

19. A method for solidifying hydraulic fill calcareous sand foundation, wherein the method for solidifying hydraulic fill calcareous sand foundation is based on the device for solidifying hydraulic fill calcareous sand foundation as claimed in claim 1, and the method for solidifying hydraulic fill calcareous sand foundation comprises the following steps:

after passing through the water intake module, seawater at room temperature between 15° C. and 25° C. enters the storage space of the solar collector bag (9);

the seawater in the storage space of the solar collector bag (9) is heated by solar energy to form high-temperature seawater with a temperature ranging from 50° C. to 70° C.;

the high-temperature seawater is injected into the loose calcareous sand formation through a water injection component, reducing the solubility of calcium carbonate in the loose calcareous sand formation and continuously generating calcium carbonate precipitation in the pores of the calcareous sand formation.

* * * * *